(12) United States Patent
Minke et al.

(10) Patent No.: US 8,122,781 B2
(45) Date of Patent: Feb. 28, 2012

(54) GENERATOR SHEAR GEAR

(75) Inventors: David Minke, Tucson, AZ (US);
William Scherzinger, Oro Valley, AZ (US); Wayne Pearson, Oro Valley, AZ (US)

(73) Assignee: Honeywell International, Inc., Morristown, NJ (US)

( * ) Notice: Subject to any disclaimer, the term of this patent is extended or adjusted under 35 U.S.C. 154(b) by 1152 days.

(21) Appl. No.: 11/934,575

(22) Filed: Nov. 2, 2007

(65) Prior Publication Data
US 2009/0118072 A1    May 7, 2009

(51) Int. Cl.
*F16H 57/00*    (2006.01)
*F16D 7/02*    (2006.01)

(52) U.S. Cl. ............................................ 74/405; 464/30

(58) Field of Classification Search .................... 74/405, 74/606 R; 60/39.091; 464/30, 32; 415/9; 416/2; 403/2; 244/17.11, 53 R, 60
See application file for complete search history.

(56) References Cited

U.S. PATENT DOCUMENTS

| | | | |
|---|---|---|---|
| 5,779,587 A * | 7/1998 | Reilly | 475/263 |
| 6,260,667 B1 | 7/2001 | Sugden | |
| 6,718,745 B1 * | 4/2004 | Adams | 56/6 |
| 7,025,560 B2 * | 4/2006 | Clark | 415/9 |

* cited by examiner

*Primary Examiner* — Thomas R Hannon
*Assistant Examiner* — Alan Waits
(74) *Attorney, Agent, or Firm* — Miriam Jackson, Esq.

(57) ABSTRACT

A shear gear arrangement with gear teeth on the bearing liner positioned to engage complementary teeth on a shear gear main body. The bearing liner is static, while the shear gear main body mounts on the rotating drive shaft. If a failure occurs, the drive shaft displacement causes the shear gear main body gear teeth to engage the bearing liner teeth, instantaneously loading the shear section of the shaft with a sufficient torque load to shear the section as designed.

18 Claims, 3 Drawing Sheets

GENERATOR SHEAR GEAR

BACKGROUND OF THE INVENTION

The present invention generally relates to apparatus for reliably shearing a coupling to a generator and, more specifically, to an apparatus for delivering sufficient torque to a shear section to cause shear section operation throughout the operational range of rotation.

Generators and other rotating machines often need a shear section or a non-shear disconnect in their drive mechanism to prevent fault propagation in the event of catastrophic failure of the driving device (gearbox) or generator/machine. This shear section will shear in the event of failure decoupling the generator from the gearbox or the prime mover. Without this shearing of the drive shaft, the failed equipment can continue rotating causing significant consequential damage to other equipment in the drive-train.

Variable speed generators require the shear section to be sized for the lowest speed and highest power, which is the maximum torque condition. However, this sizing selection creates problems at higher speeds, which can be greater than twice the minimum low speed operating point. At this higher speed, the shear section may not function as intended because the driving torque is lower for the same power level. A catastrophic failure can therefore lead to substantial damage to the generator itself and other equipment in the drive-train.

One prior art solution is disclosed in U.S. Pat. No. 6,260,667 to Sugden. Sugden uses a moving mechanism in a threaded plate located inside the main rotational shaft. This plate displaces in a bearing failure resulting in a radial offset of the rotational shaft by shearing a pin and forcing the plate axially into a mating pad creating frictional forces inducing torque to potentially shear the stub drive shaft. However, this occurs in an oil environment and the mating surfaces transmitting the torque required to shear the shaft are extremely small, which calls into question whether Sugden will induce enough torque to ensure shearing of the shaft. Sugden also creates an axial load to cause braking action, which is undesirable. The design is also complex and costly.

As can be seen, there is a need for an improved device that reliably shears at both the low speed and high torque loads and the high speed and low torque loads that can be incorporated at a low cost and simple construction to deliver reliable shearing torque.

SUMMARY OF THE INVENTION

In one aspect of the present invention, a shear gear comprises a mating shear gear main body mounted on the rotational shaft with at least one pair of gear teeth extending radially from an edge of the mating shear gear main body; a static non-rotating structure having an outer edge and an inner edge, the shaft passing through a opening formed by the inner edge, with at least one gear tooth extending radially toward the shaft from the inner edge and complementary to at least one pair of gear teeth extending from the edge of the mating shear gear main body; said static non-rotating structure and said mating shear gear main body positioned in the same radial plane and positioned so the at least one pair of gear teeth extending radially from the edge of the mating shear gear main body and the at least one gear tooth extending radially from the static non-rotating structure will engage each other in the event of a displacement failure of the rotational shaft; and a shear section between the mating shear gear main body and the prime mover adapted to shear when the gear teeth extending radially from the edge of the mating shear gear main body and the at least one gear tooth extending radially from the static non-rotating structure engage.

In another aspect of the present invention, a shear gear comprises a rotating mating shear gear main body mounted on a rotational shaft and having a set of gear teeth extending radially from the edge of the mating shear gear main body; and a static non-rotating bearing liner having a complementary set of gear teeth extending toward the mating shear gear main body gear teeth; wherein said mating shear gear main body and said bearing liner positioned in the same radial plane with both sets of gear teeth extending radially from both the mating shear gear main body and the bearing liner to engage each other in the event of a displacement failure of the rotational shaft, imparting a torque force to a shear section between the rotational shaft and the prime mover sufficient to cause shear section operation.

In a further aspect of the present invention, a shear gear comprises a rotational shaft coupling from a prime mover providing torque to a rotational shaft incorporating a shear section with a designed failure torque; a mating shear gear main body mounted on the rotational shaft with a plurality of gear teeth extending radially from the edge of the mating shear gear main body; a static non-rotating structure having a structural inner edge with an opening allowing the rotational shaft to pass through the opening and a plurality of gear teeth extending radially toward the shaft from the inner edge and complementary to the plurality of gear teeth extending from the edge of the mating shear gear main body; said static non-rotating structure and said mating shear gear main body positioned in the same radial plane and positioned so the gear teeth extending radially from the edge of the mating shear gear main body and the gear teeth extending radially from the inner edge of static non-rotating structure engage each other in the event of a failure imparting the designed operation torque to the shear section incorporated on the rotational shaft; and said plurality of gear teeth extending radially from the static non-rotating structure and said mating shear gear main body includes at least two sets of opposing gear teeth on the same structure, the two sets of gear teeth forming one set of recessed gear teeth relative to the plane of rotation and a second set of raised gear teeth relative to the plane of rotation, the two opposing sets of gear teeth forming a channel to allow unimpeded rotation of the mating shear gear main body. These and other features, aspects, and advantages of the present invention will become better understood with reference to the following drawings, description, and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The invention can be used in any application using a generator, or other rotating machine. The invention is especially useful for modern high power aircraft generators where very high rotational speeds are typically employed.

The invention uses two sets of complimentary gear teeth with one set on a fixed structural member mounted on the generator and the second set extending radially and axially from a rotating structure mounted to the rotating shaft. In the event of a failure resulting in axial or radial displacement of the rotational shaft, the two sets of the complimentary gear teeth engage, instantaneously loading sufficient torque to cause the drive shaft shear section to operate as designed.

The invention incorporates a shear gear section that comprises an incorporated radial and axial gear feature that causes an instantaneous load on the rotating member causing the drive shaft to positively shear. In the event of a bearing or other failure resulting in a radial or axial displacement of the main rotational shaft, the complimentary rotating gear teeth on the stationary gear teeth engage to induce a torque load sufficient to cause the drive shaft shear section to operate and shear.

The shear gear may utilize the bearing liner as the static member and a shear gear plate or mating shear gear main body on the drive shaft as the rotating member. The parts are designed robust enough to transmit the torque necessary to shear the drive shaft. The bearing liner may serve as half of the braking feature, and the shear gear main body is mounted on the main rotational drive shaft. In the event of a bearing failure resulting in either axial or radial movement of the rotor relative to the stator, the shear gear utilizes dog type clutch gear teeth in the axial and radial directions with mating configurations in the complementary bearing liner gear teeth creating positive engagement of the gear teeth to create the necessary torque to shear the stub drive shaft. The shear gear requires a minimal increase in weight and volume, and the design reliably transfers shear stress to a shear section to decouple a generator from its prime mover throughout its operating rotational range if a catastrophic failure occurs.

Figure 1:
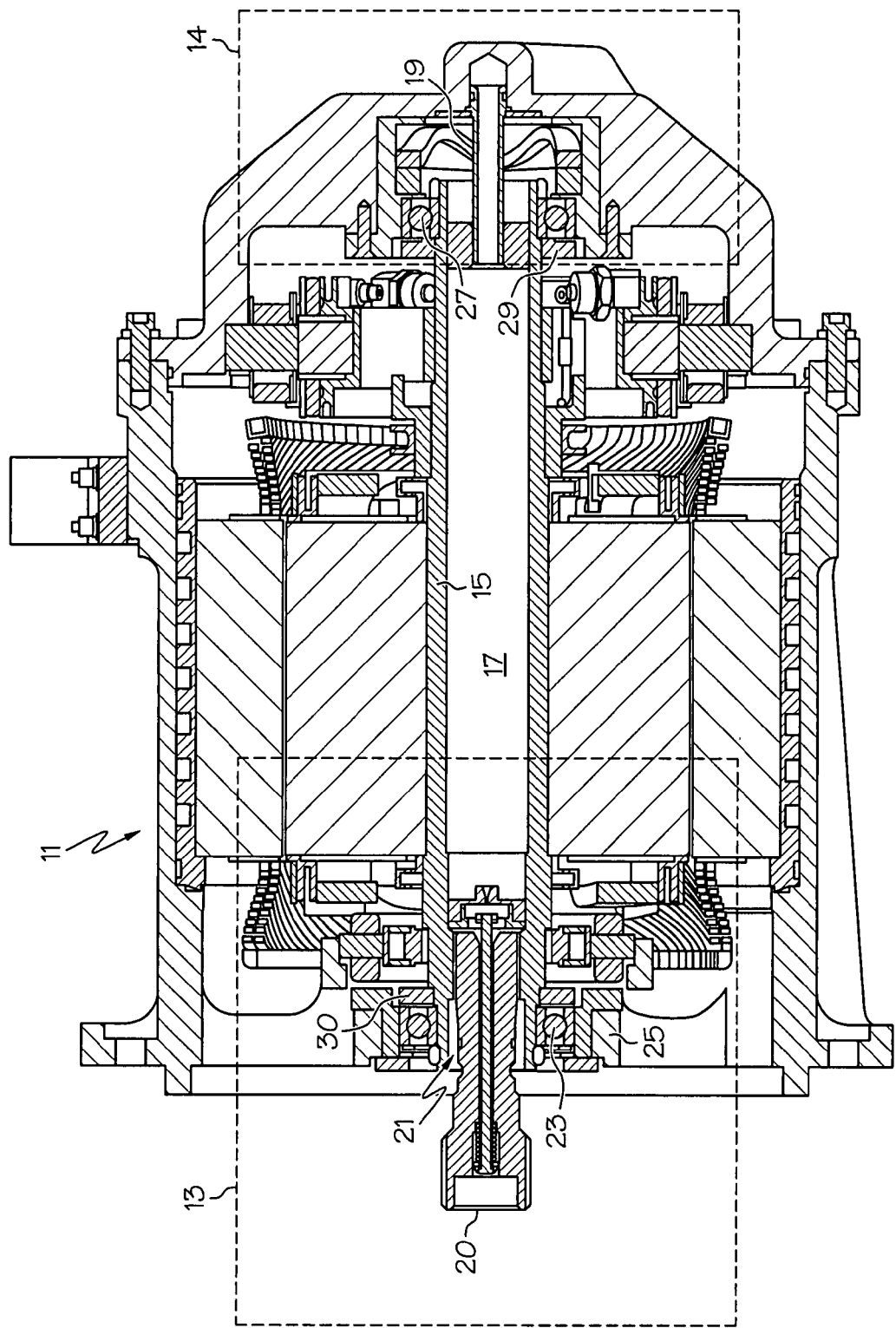
FIG. 1 shows a cross section view of a generator embodiment using the invention.

FIG. 1 shows a generator embodiment utilizing the invention. A generator 11 may have a drive end 13 where a prime mover power source (not shown) couples to the generator 11. A rotational or rotor shaft 15 may have a hollow center 17, basically forming a cylinder coupled to a prime mover (not shown) by a stub shaft 20. The stub shaft 20 may be secured inside the rotor shaft 15 to transmit rotational torque to the rotor shaft 15 of the generator 11.

Bearings 23 and 27 in the generator 11 may allow the drive shaft 15 to rotate with relatively little friction and may be a necessary component for reliable and smooth rotation of a rotating drive shaft 15. The stub shaft 20 may be engineered and designed to shear disconnecting drive from the prime mover (not shown) at a shear section 21 in the event of a excessive torque. This shearing action may minimize damage to other components. Static bearing liners 25 and 19 may help secure the bearings 23 and 27 in place and may insure smooth rotation of the drive shaft 15. In the invention, the bearing liners 25 and 19 may create stress on the shear section 21 to help reliably cause the shear section 21 to operate as intended. A shear gear 30 may be attached to the drive shaft 25, and the shear gears 30 and 29 may have gear teeth (not shown) that engage complimentary bearing liner teeth (not shown) in event of an axial or radial displacement.

Figure 3:
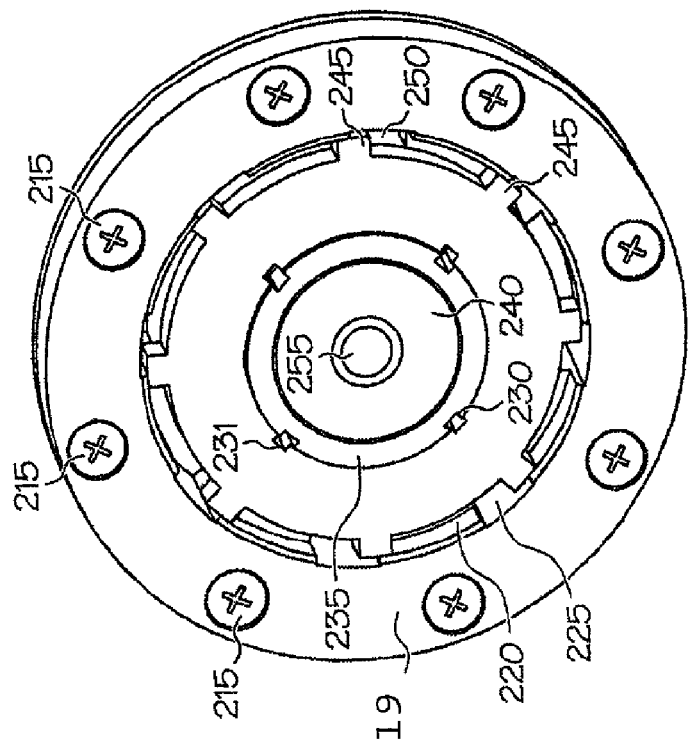
FIG. 3 shows more detail of FIG. 2 of the shear gear and bearing liner as mounted near the drive end of the generator.
Figure 2:
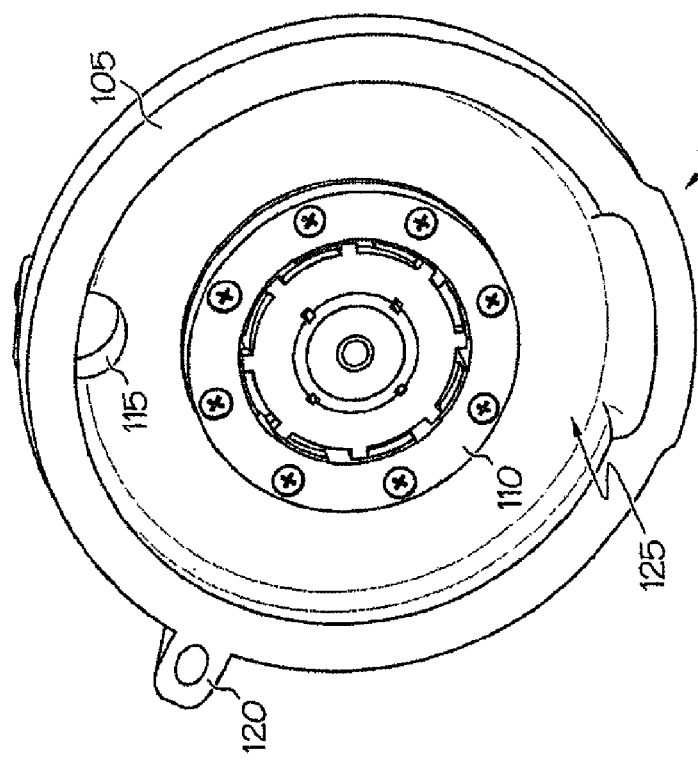
FIG. 2 shows a perspective view of the shear gear and bearing liner as mounted near the drive end of the generator.

FIGS. 2 and 3 show greater detail of a anti-drive end shear gear 101 looking at a cross section of the shear gear (element 29 on FIG. 1) at the anti-drive end (element 14 on FIG. 1). FIG. 2 shows an end bell structure 110. The end bell 110 may have an outer mating edge 105 for securing to the generator. An oil port 120 may permit adding oil to the bearings for lubrication and cooling of the associated static and rotating components. A bearing liner and shear gear 125 may provide reliable shear force in the event of a failure.

FIG. 3 shows the bearing liner and mating gear 125 in greater detail. The end bell 205 may provide a support housing for the mating gear components. The bearing liner 19 may be fixed in position by retainer screws 215. On the inner side of the bearing liner 19 proximate to the drive shaft 235 may be a series of gear teeth 220 and 225. The raised bearing liner teeth 225 may be raised relative to the plane of the rotating mating shear gear main body 250. The recessed bearing liner teeth 220 may be recessed relative to the plane of the rotating mating shear gear main body 250. The raised bearing liner teeth 225 and the recessed bearing liner teeth 220 may form a slotted channel (not shown) the mating shear gear main body 250 rotates within. Shear gear teeth 245 may extend from the outer edge of the mating shear gear main body 250 to rotate within the formed channel (not shown).

The shear gear main body 250 may be secured to the drive shaft 255. The drive shaft 255 may be hollow at the center. Keyways 230 for shear gear anti-rotation may be machined in the drive shaft 235 that complementary engage keys 231 on the shear gear main body 250 to help prevent any slippage between the drive shaft 235 and the shear gear main body 250. The hollow drive shaft 255 may rotate to rotate the shear gear main body 250.

Figure 5:
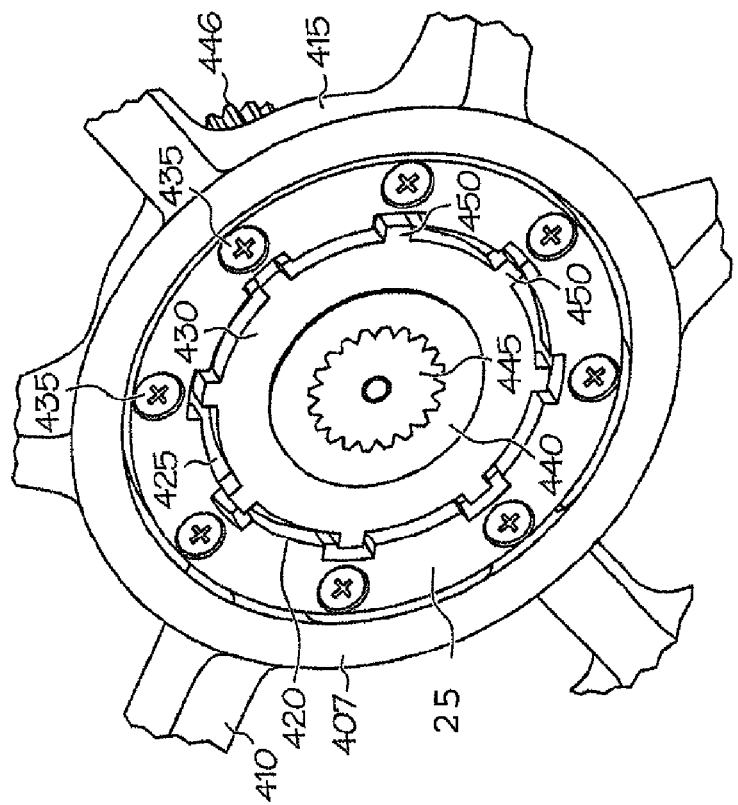
FIG. 5 shows more detail of FIG. 4 of the shear gear and bearing liner as mounted near the anti-drive end of the generator.
Figure 4:
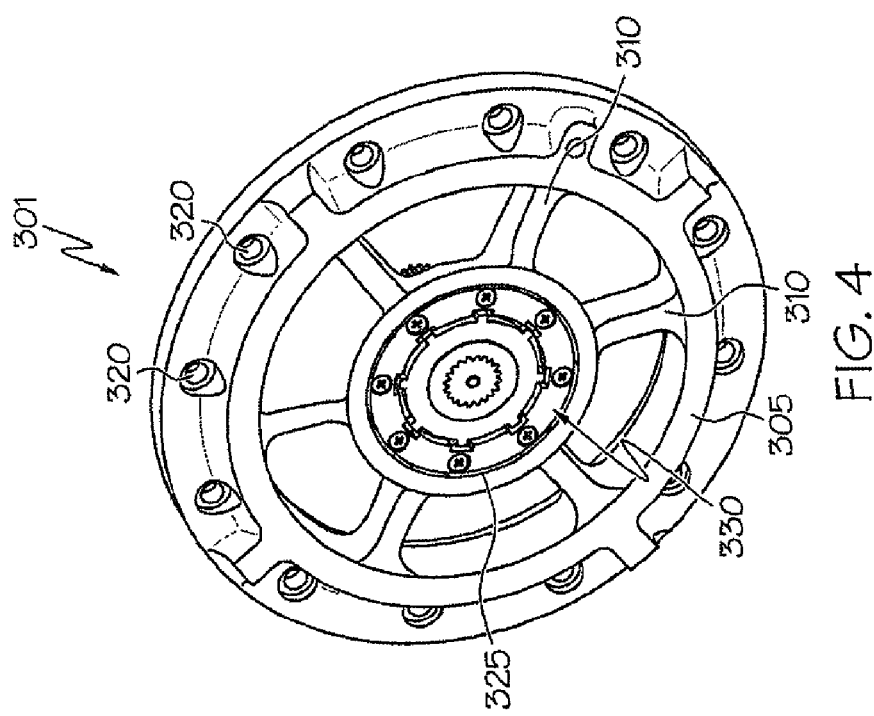
FIG. 4 shows a perspective view of the shear gear and bearing liner as mounted near the anti-drive end of the generator.

FIGS. 4 and 5 show greater detail of the drive end (element 13 on FIG. 1) shear gear looking at a cross section of the shear gear (element 30 on FIG. 1). FIG. 4 shows details of a main housing support 301. The main housing support 301 may have an outer circular support ring 305 with housing support ribs 310 extending toward the center. Mounting holes 320 may be used to mount the mating gear 330 and main housing support 301 in the generator (element 11 on FIG. 1). The main housing 325 may serve as the structural member for mounting the bearing liner and mating shear gear main body 330 via support ribs 310.

FIG. 5 shows greater details of the housing and mating shear gear main body 330. The housing support rib 410 may extend to the housing member 407 that the bearing liner 25 and mating shear gear main body 430 may fit into. The bearing liner 25 may be fixed in position by retainer screws 435. On the inner side of the bearing liner 25 proximate to the drive shaft 440 may be a series of bearing liner teeth 420 and 425. The raised bearing liner teeth 425 may be raised relative to the plane of the rotating mating shear gear main body 430. The recessed bearing liner teeth 420 may be recessed relative to the plane of the rotating mating shear gear main body 430. The raised bearing liner teeth 425 and the recessed bearing liner teeth 420 may form a slotted channel the mating shear gear main body 430 may rotate within. Shear gear teeth 450 may extend from the outer edge of the mating shear gear main body 430 to rotate within the formed channel. The shear gear main body 430 may be secured to the rotor shaft 440. The rotor shaft 440 may be hollow at the center, and a stub drive shaft 445 may be driven by shaft splines 446.

In operation, the rotational or rotor shaft 235 and 440 normally rotates unimpeded with the attached mating shear gear bodies 250 and 430 rotating within their respective channels between bearing liner teeth 220, 225, 420, and 425. In the event of a bearing or similar failure, the mating shear gear bodies 250 and 430 and their shear gear teeth 245 and 450 may be displaced radially and/or axially to engage the bearing liner teeth 220, 225, 420, and 425. The teeth may engage with each other instantaneously inducing a torque load on the shaft 235 and 440 causing the shear section (element 21 on FIG. 1) to operate as designed. Any mechanical failure resulting in a positional displacement either axially or radially may engage the teeth 220, 225, 420, 425, 245 and 450 causing torque loading to the shaft and shear section (element 21 on FIG. 1) operation.

In an alternative embodiment, the two sets of raised and recessed teeth may be located on the mating shear gear main body 250 and 430 and only a single set of gear teeth may extend radially from the bearing liners 19 and 25. In another alternative embodiment, the sets of complimentary gear teeth 220, 225, 420, 425, 245 and 450 may include gear teeth extending axially from their respective structures. For example, the planes of the bearing liner 19 and the shear gear main body 250 can be slightly offset and overlap with gear teeth 220, 225, and 245 extending axially and complimentary toward each other that may engage in an axial displacement failure. Other embodiments can include an axial set of gear teeth that complimentary extend toward a set of radial gear teeth, or various combinations that can include both axial and radial sets of complimentary gear teeth.

It should be understood, of course, that the foregoing relates to exemplary embodiments of the invention and that modifications may be made without departing from the spirit and scope of the invention as set forth in the following claims.

We claim:

1. A shear gear apparatus comprising:
a rotating mating shear gear main body mounted on a rotational shaft and having a set of gear teeth extending axially and radially from the edge of the mating shear gear main body; and
a static non-rotating bearing liner having a complementary set of gear teeth extending toward the mating shear gear main body gear teeth,
said mating shear gear main body and said bearing liner being positioned in the same or proximate radial planes with both sets of gear teeth extending from both the mating shear gear main body and the bearing liner such that they will engage each other in the event of a displacement failure of the rotational shaft, imparting in the event of the displacement failure, a torque force to a shear section between the rotational shaft and the mating shear gear main body sufficient to cause shear section operation, and
the complementary set of gear teeth extending radially from the bearing liner toward the mating shear gear main body, the complementary set of gear teeth including a set of recessed bearing liner gear teeth and a set of raised bearing liner gear teeth, wherein the set of raised bearing liner teeth and the set of recessed bearing liner teeth form a channel therebetween disposed to allow the mating shear gear main body's extended gear teeth to rotate within the channel.

2. The shear gear apparatus of claim 1, wherein the mating shear gear main body and the bearing liner are positioned proximate to a drive end of the rotational shaft.

3. The shear gear apparatus of claim 1, wherein the mating shear gear main body and the bearing liner are positioned proximate to an anti-drive end of the rotational shaft.

4. The shear gear apparatus of claim 1, the mating shear gear main body and the static non-rotating bearing liner being positioned proximate to a drive end of the rotational shaft, the apparatus including a second mating shear gear main body and a second static non-rotating bearing liner positioned proximate to an anti-drive end of the rotational shaft.

5. An apparatus comprising:
a rotational shaft incorporating a shear section with a designed failure torque;
a mating shear gear main body mounted on the rotational shaft with a plurality of gear teeth extending radially from an edge of the mating shear gear main body;
a static non-rotating structure having a structural inner edge with an opening allowing the rotational shaft to pass through the opening and a plurality of gear teeth extending radially toward the shaft from the inner edge and complementary to the plurality of gear teeth extending from the edge of the mating shear gear main body,
said static non-rotating structure and said mating shear gear main body being positioned in the same radial plane and positioned so the gear teeth extending radially from the edge of the mating shear gear main body and the gear teeth extending radially from the inner edge of the static non-rotating structure will engage each other in the event of a failure imparting the designed failure torque to the shear section incorporated on the rotational shaft, and
said plurality of gear teeth extending radially from said static non-rotating structure includes at least two sets of opposing gear teeth disposed on the same structure opposite of each other, the two sets of opposing gear teeth including one set of recessed gear teeth relative to the plane of rotation and a set of raised gear teeth relative to the plane of rotation, the two opposing sets of gear teeth forming a channel to allow unimpeded rotation of the mating shear gear main body within the channel.

6. The apparatus of claim 5, wherein the static non-rotating structure comprises a bearing liner.

7. The apparatus of claim 5, wherein the mating shear gear main body and the static non-rotating structure are positioned proximate to the drive end of the rotational shaft.

8. The apparatus of claim 5, wherein the mating shear gear main body and the static non-rotating structure are positioned proximate to the anti-drive end of the rotational shaft.

9. The apparatus of claim 5, the mating shear gear main body and the static non-rotating structure being positioned proximate to a drive end of the rotational shaft, the apparatus including a second mating shear gear main body and a second non-rotating structure positioned proximate to an anti-drive end of the rotational shaft.

10. A shear gear apparatus on a rotational shaft, comprising:
a mating shear gear main body mounted on the rotational shaft with a plurality of gear teeth extending from an edge of the mating shear gear main body;
a static non-rotating structure having an outer edge and an inner edge, the shaft passing through an opening formed by the inner edge, with at least one gear tooth of a plurality of gear teeth extending from the inner edge and complementary to at least one pair of the plurality of gear teeth extending from the edge of the mating shear gear main body,
said static non-rotating structure and said mating shear gear main body being positioned in the same plane or in proximate radial planes and positioned so the at least one of the plurality of gear teeth extending from the edge of the mating shear gear main body and the at least one gear tooth extending from the edge of the static non-rotating structure will engage each other in the event of a displacement failure of the rotational shaft, wherein the plurality of gear teeth on the static non-rotating structure include one or more raised teeth raised relative to the radial plane of the mating shear gear main body and one or more recessed teeth recessed relative to the radial plane of the mating shear gear main body; and a shear section coupled to the rotational shaft adapted to shear when the mating shear gear main body displaces axially or radially to engage the complimentary gear teeth extending from the mating shear gear main body and the static non-rotating structure.

11. The shear gear apparatus of claim 10, wherein the gear teeth on the mating shear gear main body include one or more teeth extending radially from the edge of the mating shear gear main body.

12. The shear gear apparatus of claim 10, wherein the gear teeth on the mating shear gear main body include one or more teeth extending axially from the edge of the mating shear gear main body.

13. The shear gear apparatus of claim 10, wherein the at least one gear tooth on the static non-rotating structure includes at least one gear tooth extending radially from the inner edge.

14. The shear gear apparatus of claim 10, wherein the at least one gear tooth on the static non-rotating structure includes at least one gear tooth extending axially from the inner edge.

15. A shear gear apparatus mounted on a rotational shaft having a drive end and an anti-drive end, comprising:
   a first mating shear gear main body mounted on the anti-drive end of the rotational shaft with one or more gear teeth extending from an edge of the first mating shear gear main body;
   a first structure fixedly mounted on the anti-drive end of the rotational shaft and having an outer edge and an inner edge, the rotational shaft passing through an opening formed by the inner edge, with at least one gear tooth extending from the inner edge and complementary to said one or more gear teeth extending from the edge of the first mating shear gear main body;
   a second mating shear gear main body and a second structure disposed proximate to the drive end of the rotational shaft, the second mating shear gear main body including one or more gear teeth extending from an outer edge of the second mating shear gear main body, the second structure including one or more gear teeth extending from an inner edge of the second structure disposed complementary to said one or more pear teeth of the second mating shear gear main body,
   the first and second structures being positioned in the same or proximate radial plane of respective first and second mating shear gear main bodies and positioned so at least one of the one or more gear teeth extending from respective edges of the first and second mating shear gear main bodies and the one or more gear teeth extending from the respective first and second structures will engage each other in the event of a displacement failure of the rotational shaft; and
   a shear section disposed between the second mating shear gear main body and the drive end of the rotational shaft and adapted to shear when the at least one of the one or more gear teeth extending from respective edges of the first and second mating shear gear main bodies and the one or more gear teeth extending from respective first and second structures engage.

16. The shear gear apparatus of claim 15, wherein the one or more gear teeth extending from the inner edge of either the first structure or the second structure further include a set of recessed gear teeth and a set of raised gear teeth, the set of recessed gear teeth and the set of raised gear teeth forming a channel therebetween disposed to allow the respective first or second mating shear gear main body's one or more extended gear teeth to rotate within the channel.

17. The shear gear apparatus of claim 16, wherein the second structure includes a bearing liner.

18. The shear gear apparatus of claim 15, wherein the one or more gear teeth of the first and second mating shear gear main bodies extend radially from respective first and second mating shear gear main bodies away from the rotational shaft toward the inner edge of the respective first and second structures.

* * * * *